United States Patent [19]
Poulos

[11] Patent Number: 5,542,242
[45] Date of Patent: Aug. 6, 1996

[54] CLIPPINGS RECEPTACLE WITH ORBITING LAWN MOWER

[76] Inventor: Philip Poulos, 6 Thorley St., Carrollton, Va. 23314

[21] Appl. No.: 445,450

[22] Filed: May 23, 1995

[51] Int. Cl.⁶ .................................................. A01D 34/70
[52] U.S. Cl. ............................ 56/13.5; 56/16.9; 56/202; 56/228; 56/16.6
[58] Field of Search ................................. 285/202, 199, 285/201, 204, 228, 16.9, 13.5, 16.6

[56] References Cited

U.S. PATENT DOCUMENTS

| | | | |
|---|---|---|---|
| 3,367,092 | 2/1968 | Gifford | 56/16.6 |
| 3,924,389 | 12/1975 | Kita. | |
| 4,158,279 | 6/1979 | Jackson | 56/202 |
| 4,991,384 | 2/1991 | Steckly | 56/202 |
| 5,007,234 | 4/1991 | Shurman et al.. | |
| 5,163,273 | 11/1992 | Wojtkowski et al.. | |
| 5,204,814 | 4/1993 | Noonan et al.. | |
| 5,323,593 | 6/1994 | Cline et al.. | |
| 5,359,838 | 11/1994 | Madson | 56/16.6 |

Primary Examiner—Terry Lee Melius
Assistant Examiner—Heather Chun Shackelford
Attorney, Agent, or Firm—Terrance L. Siemens

[57] ABSTRACT

A combination self-propelled lawn mower and wheeled cart for receiving and storing mower clippings. The mower is connected to the cart by an arm which turns a vertical drive shaft centrally located within the cart. This drive shaft is, in turn, geared to an axle attached to two wheels. As the mower moves, it circles the cart, and simultaneously rotates the drive shaft, and hence the axle. The cart is thus propelled forwardly, the mower simultaneously circling or orbiting about the cart. A chute attached to the mower receives clippings, and discharges the same into a receptacle located on the cart. One manual control located on the cart disengages the motive power to the cart wheels. A second manual control disengages motive power to the mower wheels. The mower and cart each have a combination of fixed and caster wheels, to stably and smoothly negotiate terrain. The arm connecting the mower to the cart is adjustable as to its position on the cart, so that the chute and an opening formed in the top of the clippings receptacle align appropriately.

20 Claims, 5 Drawing Sheets

CLIPPINGS RECEPTACLE WITH ORBITING LAWN MOWER

BACKGROUND OF THE INVENTION

1. Field of the Invention

The present invention relates to a combination power lawn mower and wheeled clippings receptacle. When cutting a lawn, the wheels of both the mower and the receptacle are powered by the mower. The receptacle is propelled along a linear path, and the mower simultaneously orbits about the receptacle. The mower discharges clippings into the receptacle, thus gathering a large quantity of clippings, and thereby avoiding the necessity of frequent interruption of the cutting chore in order to dispose of the clippings.

2. Description of the Prior Art

The chore of cutting the grass of a yard or field is an onerous one, and has inspired many automated devices for reducing human effort required to accomplish this chore to be proposed in the prior art.

Several factors are present which increase the effort required of a human operator, and which greatly complicate automatic operation. One is the steering and control of the grass cutting operation. The prior art has suggested numerous contrivances to deal with this factor.

One approach is to automate the cutting of a yard by designing a mower or like cutting appliance to sense or remember, and then respond to, obstacles. Examples of this approach are seen in U.S. Pat. Nos. 3,924,389, issued to Stanley B. Kita on Dec. 9, 1975, 5,007,234, issued to Darlene M. Shurman et al. on Apr. 16, 1991, 5,163,273, issued to David J. Wojtkowski et al. on Nov. 17, 1992, 5,204,814, issued to Thomas H. Noonan et al. on Apr. 20, 1993, and 5,323,593, issued to Lohn G. Cline on Jun. 28, 1994. The last cited example responds to an obstacle by altering its trajectory according to a predetermined scheme. The resultant final negotiated path is random.

The remaining examples all have systems for sensing position, and maintaining to the best degree possible an initial, predetermined scheme.

At best, this group can reasonably be expected to cut a yard while operating unattended. However, effectiveness and completeness of the job will vary with the sophistication and complexity of the machine. Those machines which are best suited to complete the task are likely to be encumbered by complicated and possibly redundant sensing and calculating control systems.

It will be appreciated that regardless of the success of the above devices, and similar devices which may have been proposed but not detailed herein, that they address only part of the total work that is to be performed. In most cases, the cuttings must be collected for disposal, since normally it is not acceptable practice to leave the cuttings on the grass.

Cuttings must be collected either simultaneously with cutting, or in a subsequent operation. However, none of the above cited devices address this aspect of the task.

Current practice, with respect to apparatus being marketed, is to attach a clippings collector such as a removable bag supported on a frame, to the mower, which may be a manually or power propelled mower. In all cases known to the present inventor, the collector is carried aboard the mower, and is fixed thereto.

Known automatically guided grass cutting devices have not been associated with clipping recovery apparatus.

None of the above inventions and patents, taken either singly or in combination, is seen to describe the instant invention as claimed.

SUMMARY OF THE INVENTION

The present invention seeks as its primary purpose automated, simultaneous cutting of a yard, and collection of clippings by a powered apparatus. It is preferred that, rather than encumber the device with a power plant, cutting apparatus, collection apparatus, and a guidance system, the device be as uncomplicated possible, and free of delicate, complicated, and possibly unreliable components such as microprocessor, sensors, transducers, control linkages, and the like. Such components are possibly difficult and expensive to obtain, install, adjust, maintain, and replace when required. They also increase the bulk, weight, and complexity of the device.

Instead, it is preferred to concentrate upon carrying out the principal aspects of the chore under power. These aspects include cutting grass, collecting clippings, and carrying the collected clippings about until it is time for disposal. It is further desired to maximize the amount of clippings that can be carried, so that the cutting operation need be interrupted as little as possible.

It is also desired to rely substantially upon conventional products, where possible, to avoid the necessity of extensive designing and tooling up to fabricate a substantially new device.

To these ends, the invention comprises a circular wheeled cart having a one or multisection receptacle, to which is attached a self-propelled mower. The mower is attached to the cart by a frame. A power shaft extends from the mower to the cart, so that power propelling the mower also propels the cart. The cart moves linearly, and the mower constantly orbits the cart. The path of the mower is trochoidal with respect to the yard being mowed. The consequence of this arrangement are that cutting is more even than would be achieved by a parallel pass scheme, and the redundant passes maximize effectiveness of clipping removal.

The combined device moves along a linear path, and which is manually adjusted as necessary. Adjustment is accomplished by maneuvering the combination by handles formed in the frame connecting the mower to the cart.

The combined device moves slowly, operates thoroughly and effectively, and is capable of operating for a long period of time since a large and heavy clippings load is accommodated by provision of a wheeled receptacle which is separate from the mower.

Accordingly, it is a principal object of the invention to provide a self-propelled device including a lawn mower and a clippings collector.

It is another object of the invention that the combined mower and collector be powered by one motor.

It is a further object of the invention that the mower and the clippings collector be removably separable from one another.

It is an additional object of the invention to remain unencumbered by a complicated Guidance system incorporating any of microprocessor, sensors, transducers, and control linkages.

It is again an object of the invention to maximize the time period that the device operates without removal of clippings.

Another object of the invention is to employ conventional apparatus to form the novel combination.

Yet another object of the invention is to cut Grass evenly and thoroughly.

Still another object of the invention is to assure that clippings be thoroughly removed from the cut Grass.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
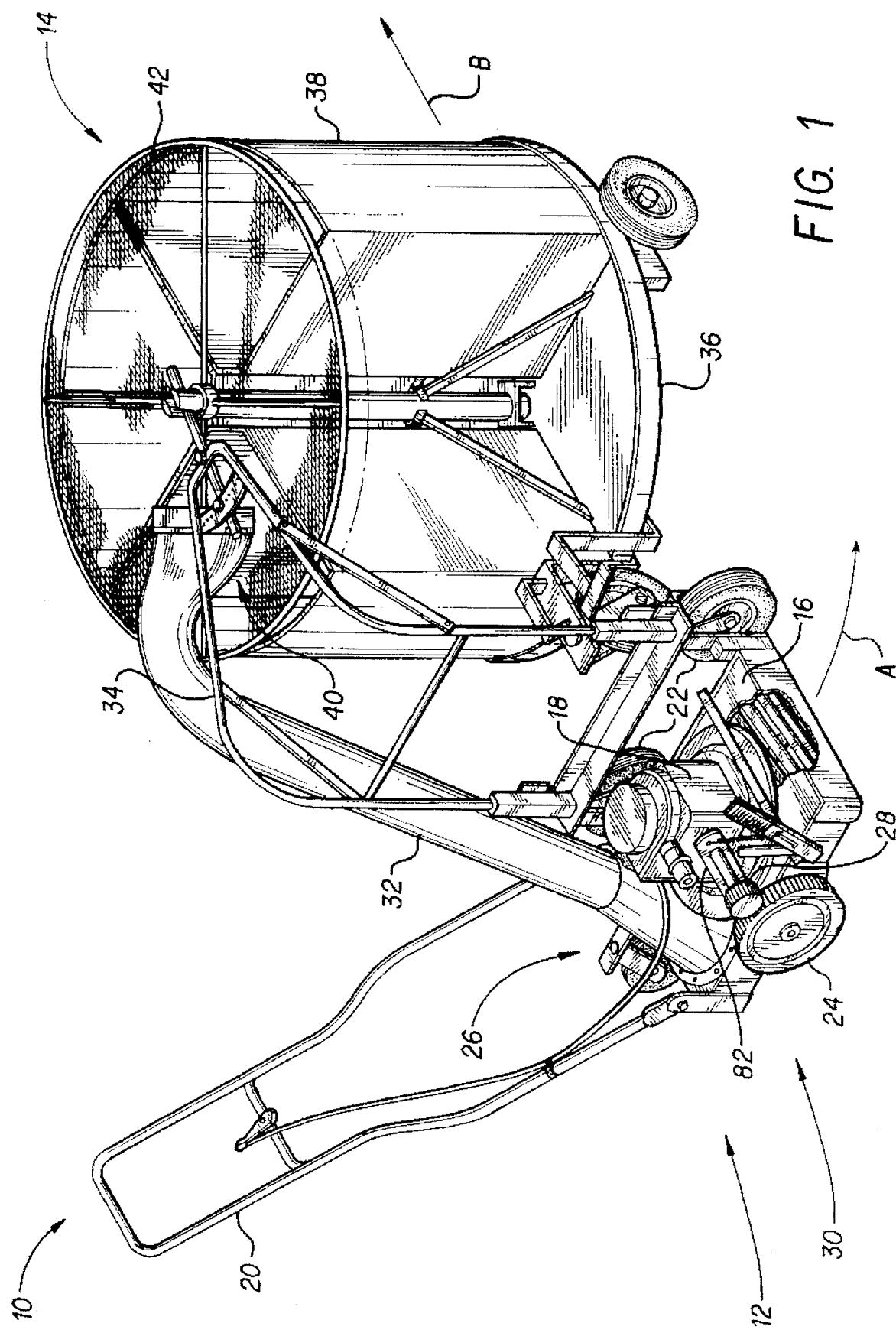
FIG. 1 is a perspective view of the invention.

Referring now to FIG. 1, the present invention comprises a lawn cutting device 10 combining a self-propelled lawn mower 12 and a wheeled cart 14 for receiving and storing clippings. Mower 12 is generally of conventional type, including a deck 16 supporting a motor 18, a maneuvering handle 20 incorporating conventional controls, fixed wheels 22,24, and a caster wheel 26. Self-propulsion is accomplished by a motor driven cog 28 engaging wheel 24, which thus is a driven wheel. Motor 18 conventionally drives a cutter or blade 30, which both cuts grass and subjects the clippings (not shown) to pneumatic pressure. A chute 32 receives clippings, which are pneumatically transported therethrough.

Cart 14 is connected to mower 12 by an arm 34. Preferably, arm 34 is a two member assembly contacting mower 12 at two points, so that mower 12 is constrained to travel in a manner to be set forth hereinafter.

Cart 14 has a platform 36 supporting wheels (more clearly shown in FIG. 2) and a covered receptacle 38. Receptacle 38 may comprise a single large receptacle, or may comprise separate smaller, complementary receptacles. Chute 32 conducts clippings into receptacle 38 through an opening 40 formed in the cover 42 of receptacle 38.

As mower 12 operates, it orbits about cart 14, as indicated by arrow A. Cart 14 is propelled linearly, indicated by arrow B.

Figure 2:
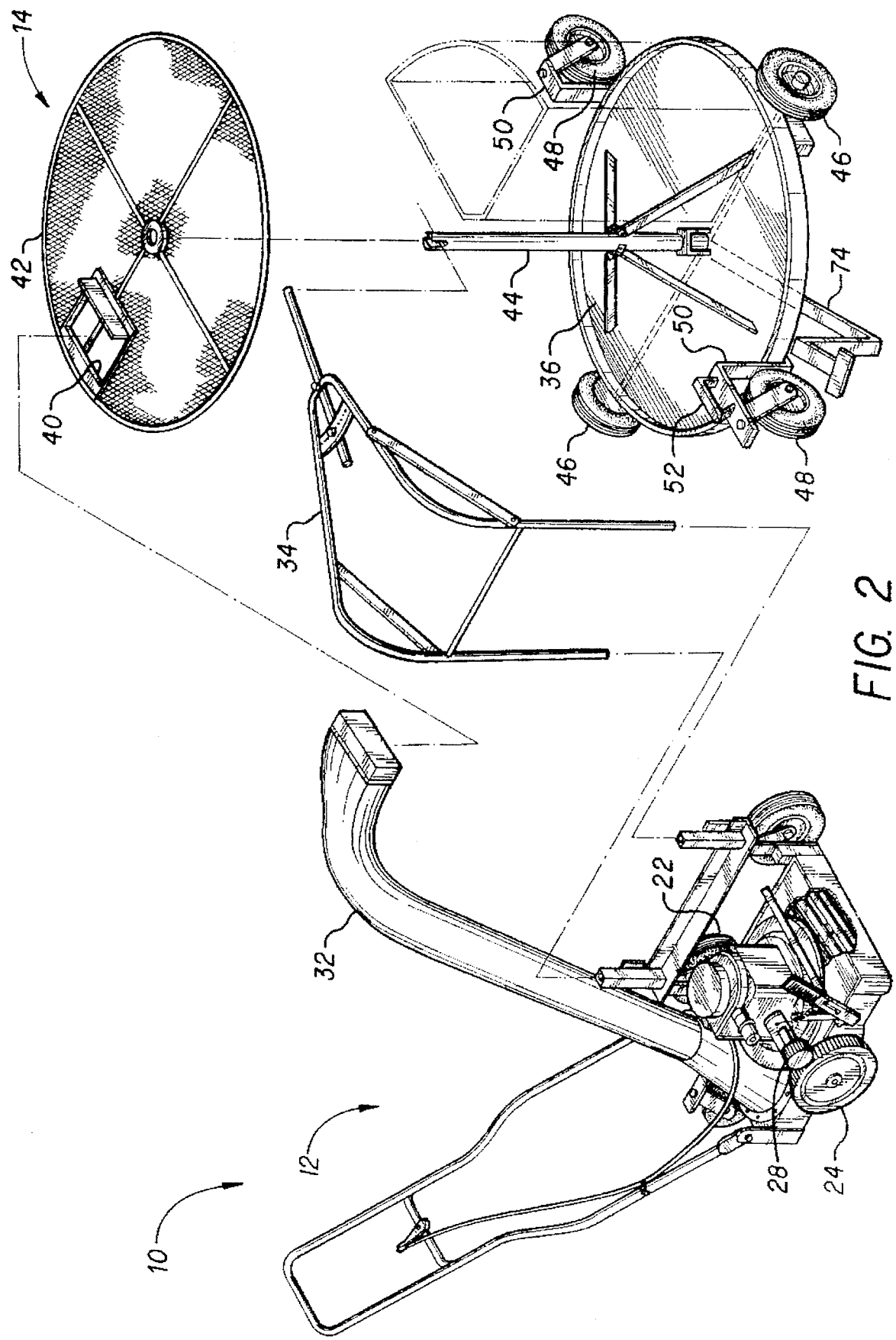
FIG. 2 is an exploded view of the components of FIG. 1.

Referring now to FIG. 2, with receptacle 38 removed for clarity, platform 36 is seen to support a vertical drive shaft 44. Fixed wheels 46 are journaled in fixed relation to platform 36. Caster wheels 48 depend from supports 50 fixed to platform 36. One support 50 includes a handle 52 for maneuvering cart 14.

It will be appreciated that lawns are not purely planar, and that uneven ground surfaces, irregular grass growth, small objects, and other interruptions to the terrain will regularly be encountered. To render tracking as smooth and straight as possible, while allowing some accommodation of ground irregularities, the wheels of device 10 include at least one caster wheel 26 located on mower 12 as well as caster wheels 48 serving cart 14, in addition to fixed wheels 22,24,46. For stable support, it is preferred that mower 12 have two fixed wheels 22 and a caster wheel 48, while cart 14 have two fixed wheels 46 and two caster wheels 48, due to its greater size.

Wheels 46 of cart 14 receive power from mower 12 in the following manner. Drive shaft 44 protrudes through cover 42, and engages arm 34. Arm 34 interfits with drive shaft 44 so that as mower 12 orbits about cart 14, arm 34 turns drive shaft 44. Arm 34 need not lock to drive shaft 44, but engages drive shaft 44 so as to induce rotation responsive to orbiting by mower 12.

As depicted, arm 34 is can be lifted upwardly out of engagement with drive shaft 44, which is one advantage of the vertical orientation of drive shaft 44. This action will also separate mower 12 from cart 14, as might be required to empty cart 14, or to service mower 12.

Preferably, drive shaft 44 is centrally located within cart 14. This location assures that mower 12 will orbit concentrically about cart 14. It would be possible to offset drive shaft 44 from the center of cart 14, with the consequence that mower 12 would continue to orbit, although the circular orbit thus produced would not be concentric with respect to cart 14. While this arrangement would be operable, concentric orbiting is more efficient with respect to enabling arm 34 to be of minimal length as it spans drive shaft 44 and mower 12. Also, the amount of space required for device 10 to function is minimized by concentric arrangement.

Figure 3:
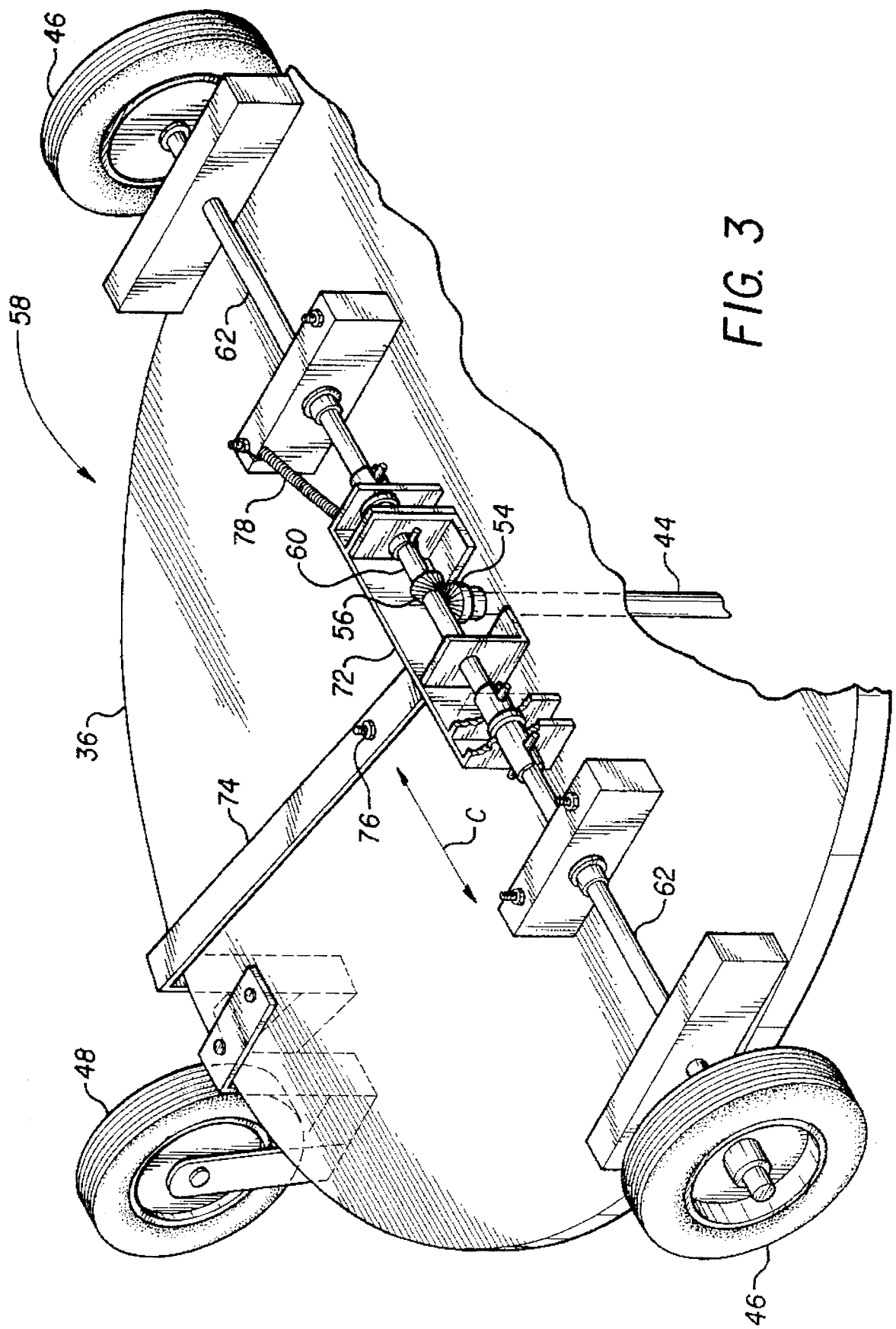
FIG. 3 is a bottom perspective view of the invention, partially broken away.

As seen more clearly in FIG. 3, it being recalled that this is a bottom view, drive shaft 44 terminates in a gear 54. Gear 54 drives a gear 56 secured to axle 58. Axle 58 is formed in three sections, there being a central section 60 and two wheel sections 62 each connected to one drive wheel 46.

This construction of axle 58 serves the purposes of a cart drive detent for controlling driven connection of wheels 46 of cart 14 to rotary power provided by mower 12. Normally, the three sections of axle 58 are locked together, so that orbiting of mower 12 about cart 14 rotates drive shaft 44, which turns gears 54 and 56, thus ultimately propelling cart 14 forwardly or linearly.

Figure 4:
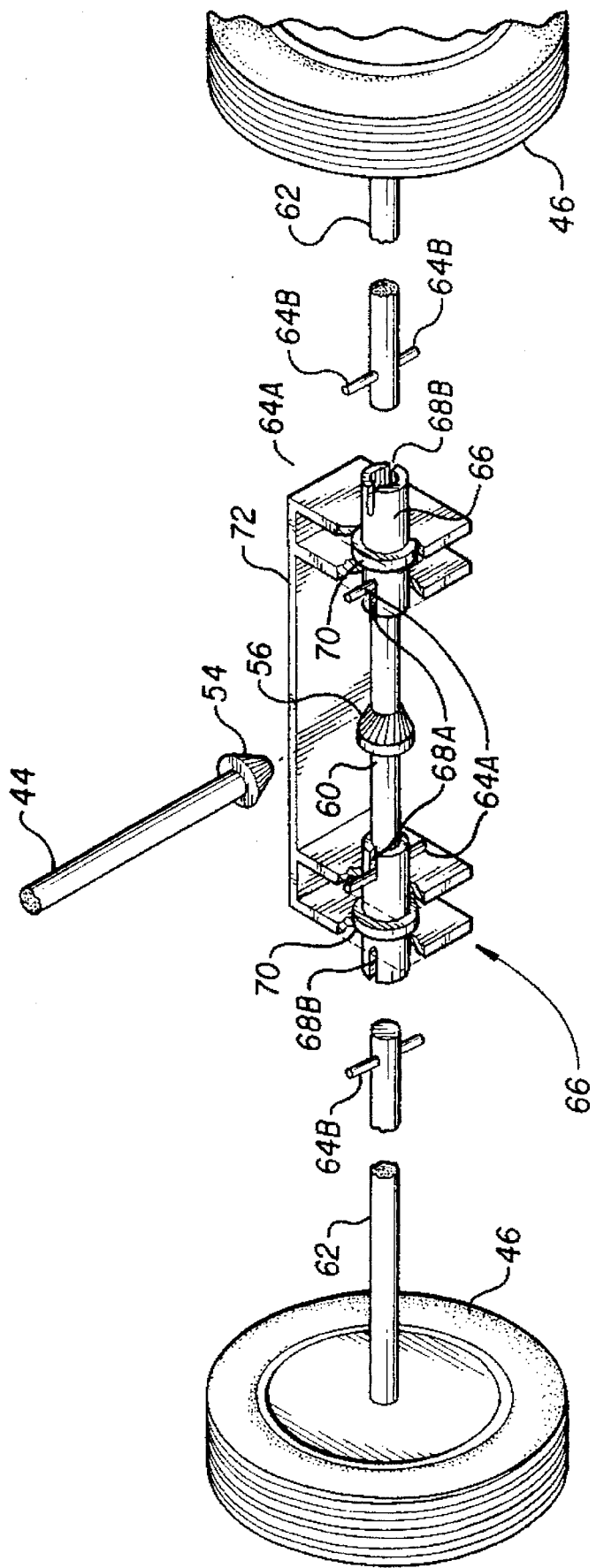
FIG. 4 is an exploded perspective detail view of components seen at the center of FIG. 3, drawn to enlarged scale.

The cart drive detent will be described with reference to FIG. 4. Wheel sections 62 and central section 60 of axle 58 have pins 64A,64B projecting radially therefrom. Collars 66 have diametrically opposed slots 68A,68B, which are aligned with pins 64A,64B. Each collar telescopically engages central section 60 and one wheel section 62. Slots 68A constantly surround pins 64A. This may be achieved by sealing slots 68A after assembly, or by designing slots 68A to be so deep that disengagement of pins 64A is impossible.

Collars 66 also each have a central, radially oriented external flange 70. A yoke 72 is assembled over collars 66 so as to surround flanges 70. As best seen in FIG. 3, yoke 72 is slidably mounted to platform 36 in a direction parallel to axle 58, indicated by arrow C, and suitably constrained against excessive travel. Again referring to FIG. 4, when moved, yoke 72 forces collars 66 to move virtually in lockstep. Thus, yoke 72 positions collars 66 such that, selectively, pins 64B penetrate slots 68B, and are disengaged therefrom by moving yoke 72 in the opposite direction.

When slots 68A and pins 64B interengage, axle 58 turns as a solid or continuous member, thus driving wheels 46 responsive to rotation of gear 56.

Yoke 72 is actuated by a lever 74, which, as seen in FIG. 3, is pivotally mounted to platform 36 by a bolt 76. Lever 74 contacts and engages yoke 72 by any suitable method, and when pivotted, moves yoke 72 accordingly. As will be seen in FIG. 2, lever 74 is accessible at its end on the exterior of cart 14 to a human operator.

Thus, driving contact of arm 34 is interrupted and controlled by moving lever 74. A spring 78 shown in FIG. 3 is mounted to cart 14 and to yoke 72 at its respective ends. Spring 78 urges yoke 72 into the engaged position. Thus, a conscious effort by a human operator is required to disengage drive wheels 46 from rotary power supplied by mower 12.

A mower wheel engagement mechanism is provided so that motor 18 may be selectively engaged with and disengaged from driven wheel 24. Any suitable engagement mechanism may be provided, these being fairly conventional, and one arrangement will be briefly described.

Figure 5:
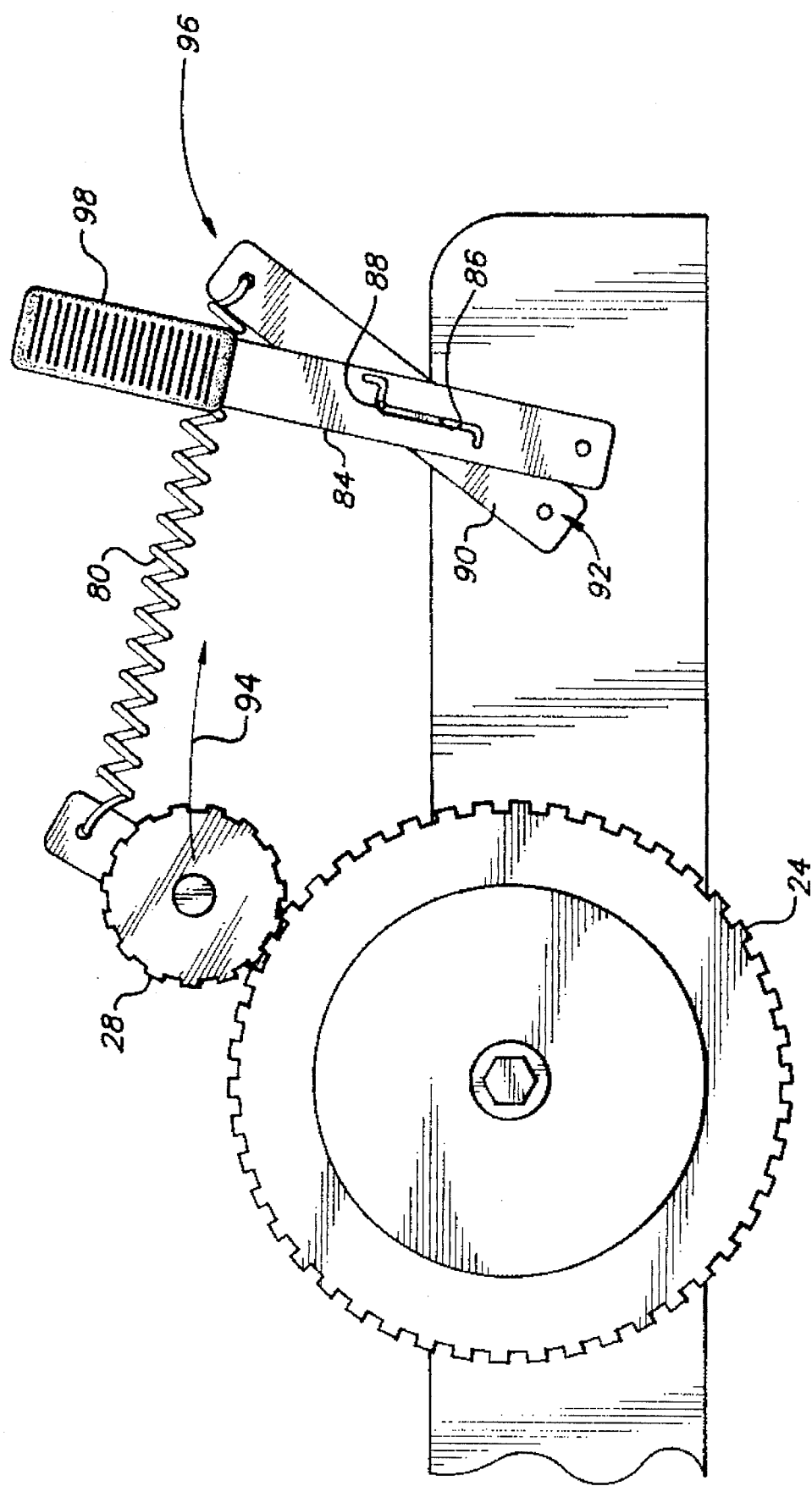
FIG. 5 is a side elevational detail view of the mower wheel engagement mechanism, which is shown at the lower left of FIG. 1 drawn to enlarged scale.

Referring now to FIG. 1, drive cog 28, which is indirectly rotated by motor 18, is pivotally mounted on mower 12 to travel in an arc arranged to intersect with driven wheel 24. Cog 28 is driven by a chain or belt 82 engaging a stationary but rotatable power shaft rotated by motor 18. Arcuate movement of cog 80 is accommodated by belt 82. As shown in FIG. 5, an engagement arm 84 is movably attached to mower 12 and connected to cog 28 by a spring 80. Engagement arm 84 selectively moves cog 28 into and out of engagement with wheel 24.

Engagement arm 84 has a stepped slot 86, which receives a peg 88 projecting from an arm 90. Arm 90 is pivotally fixed to mower 12 at its lower end, generally designated at 92. Arm 90 is fixed to spring 80 at its upper end, generally designated 96. Spring 80 acts to maintain cog 80 in contact with wheel 24 by drawing arm 90 in a direction opposite that disengaging cog 28. The direction of disengagement is indicated by arrow 94. By grasping engagement arm 84 by handle 98 and pulling in the direction of arrow 94, the operator manually disengages cog 28 from wheel 24. Interaction of pivoting engagement arm 84 and arm 90 positions peg 88 at a point along slot 86 so as to lock these components in a selected position.

Returning to FIG. 2, it will be seen that chute 32 aligns with opening 40 formed in cover 42 of receptacle 38. From time to time, minor misalignment will occur, and the following adjustment is required to reestablish proper alignment.

Arm 34 includes a rack 100 having a series of threaded holes 102. Movable section 34A of arm 34 is pivotally fixed at 104 to arm 34, and locked into a desired angular adjustment by tightening a bolt 106 pinning section 34A at a selected position on rack 100.

Variations to device 10 will occur to those of skill in the art. For example, it would be possible that drive shaft 44 be oriented other than vertical. Also, it would be possible to link the mower driven wheel directly to a cart driven wheel by a horizontal shaft, although this would defeat the present uncomplicated method of detaching cart 14 from mower 12.

It is to be understood that the present invention is not limited to the embodiments described above, but encompasses any and all embodiments within the scope of the following claims.

I claim:

1. A grass cutting device comprising:

a powered, self-propelled mower having a motor, a cutter operably connected to said motor, and wheels supporting said mower, one said wheel being a driven wheel drivingly connected to said motor;

a cart having wheels including driven wheels, and a receptacle for receiving clippings cut by said cutter and transported by said cutter to said receptacle;

a chute for conducting clippings cut by said cutter to said receptacle;

a connecting arm connecting said mower to said cart; and a drive shaft mounted on said cart and rotated by said mower and connected to said driven wheels of said cart, whereby operation of said mower drives said cutter and propels both said mower and said cart.

2. The grass cutting device according to claim 1, said cart further comprising an axle drivingly connected to said wheels of said cart, said drive shaft being vertically supported within said cart and geared to said axle.

3. The grass cutting device according to claim 2, said connecting arm also engaging and rotating said drive shaft, whereby said driven wheels of said cart are driven by orbiting of said mower about said cart, and said cart is thereby propelled linearly.

4. The grass cutting device according to claim 2, further comprising a cart drive detent for controlling driven connection of said wheels of said cart to rotary power provided by said mower.

5. The grass cutting device according to claim 4, said axle having a central section, and two wheel sections each connected to one said wheel of said cart, said cart drive detent comprising two collars each having means defining a pair of diametrically opposed slots therein and a central radially oriented external flange, each said collar aligned with and telescopically engageable with one of said two wheel sections of said axle, each said wheel section of said axle having a pin projecting radially therefrom, each said pin engageable with an associated said collar by penetrating said groove of said associated collar, said cart drive detent further comprising a collar positioning yoke engaging said two collars and selectively sliding said two collars into and out of engagement with said two wheel sections of said axle, said cart drive detent further comprising a lever mounted to said cart for actuating said yoke, said lever contacting and engaging said yoke, said lever having an end accessible to a human operator on the exterior of said cart, whereby driving contact of said connecting arm is interrupted by moving said lever, said cart drive detent further comprising a spring mounted to said cart and to said yoke, urging said yoke into the engaged position.

6. The grass cutting device according to claim 1, further comprising a mower wheel engagement mechanism attached to said mower, operating selectively to engage and disengage said driven wheel from said motor.

7. The grass cutting device according to claim 6, said mower wheel engagement mechanism comprising:

a drive cog rotatingly driven by said mower and pivotally mounted on said mower to travel in an arc intersecting said driven wheel; and an engagement arm movably attached to said mower and connected to said drive cog, said engagement arm selectively movable to move said drive cog into and out of engagement with said driven wheel.

8. The grass cutting device according to claim 1, said connecting arm having means for adjusting angularity of said connecting arm with respect to said cart.

9. The grass cutting device according to claim 1, said mower having two fixed wheels and a caster wheel, for stably supporting said mower on the ground and to enable smooth tracking as said mower moves along the ground, and said drive wheels of said cart being fixed to said cart, and said cart further having at least one caster wheel attached thereto, said drive wheels of said cart and said caster wheel of said cart stably supporting said cart on the ground and enabling smooth tracking along the ground.

10. The grass cutting device according to claim 1, said drive shaft centrally located within said cart, whereby said mower orbits concentrically around said cart.

11. The grass cutting device according to claim 1, said cart further comprising a handle attached thereto for maneuvering.

12. A grass cutting device comprising:
   a powered, self-propelled mower having a motor, a cutter operably connected to said motor, and wheels supporting said mower, one said wheel being a driven wheel drivingly connected to said motor;
   a cart having wheels including driven wheels, an axle drivingly connected to said wheels of said cart, a drive shaft rotated by said mower and connected to said axle of said cart by gears, said drive shaft being vertically supported within said cart, said cart also having a receptacle for receiving clippings cut by said cutter and transported by said cutter to said receptacle, said cart further comprising a handle attached thereto for maneuvering;
   a chute for conducting clippings cut by said cutter to said receptacle; and
   a connecting arm connecting said mower to said cart and engaging and rotating said vertically supported drive shaft, whereby operation of said mower drives said cutter and propels both said mower and said cart.

13. The grass cutting device according to claim 12, further comprising a cart drive detent for controlling driven connection of said wheels of said cart to rotary power provided by said mower.

14. The grass cutting device according to claim 13,
   said axle having a central section, and two wheel sections each connected to one said wheel of said cart,
   said cart drive detent comprising two collars each having means defining a pair of diametrically opposed slots therein and a central radially oriented external flange, each said collar aligned with and telescopically engageable with one of said two wheel sections of said axle, each said wheel section of said axle having a pin projecting radially therefrom, each said pin engageable with an associated said collar by penetrating said groove of said associated collar,
   said cart drive detent further comprising a collar positioning yoke engaging said two collars and selectively sliding said two collars into and out of engagement with said two wheel sections of said axle,
   said cart drive detent further comprising a lever mounted to said cart for actuating said yoke, said lever contacting and engaging said yoke, said lever having an end accessible to a human operator on the exterior of said cart, whereby driving contact of said connecting arm is interrupted by moving said lever, said cart drive detent further comprising a spring mounted to said cart and to said yoke, urging said yoke into the engaged position.

15. The grass cutting device according to claim 12, further comprising a mower wheel engagement mechanism attached to said mower, operating selectively to engage and disengage said driven wheel from said motor.

16. The grass cutting device according to claim 15, said mower wheel engagement mechanism comprising:
   a drive cog rotatingly driven by said mower and pivotally mounted on said mower to travel in an arc intersecting said driven wheel; and
   an engagement arm movably attached to said mower and connected to said drive cog, said engagement arm selectively movable to move said drive cog into and out of engagement with said driven wheel.

17. The grass cutting device according to claim 12, said connecting arm having means for adjusting angularity of said connecting arm with respect to said cart.

18. The grass cutting device according to claim 12, said mower having two fixed wheels and a caster wheel, for stably supporting said mower on the ground and to enable smooth tracking as said mower moves along the ground, and said drive wheels of said cart being fixed to said cart, and said cart further having at least one caster wheel attached thereto, said drive wheels of said cart and said caster wheel of said cart stably supporting said cart on the ground and enabling smooth tracking along the ground.

19. The grass cutting device according to claim 12, said drive shaft centrally located within said cart, whereby said mower orbits concentrically around said cart.

20. A grass cutting device comprising:
   a powered, self-propelled mower having a motor, a cutter operably connected to said motor, wheels supporting said mower, one said wheel being a driven wheel drivingly connected to said motor, and a mower wheel engagement mechanism attached to said mower, operating selectively to engage and disengage said driven wheel from said motor, said mower wheel engagement mechanism comprising:
      a drive cog rotatingly driven by said mower and pivotally mounted on said mower to travel in an arc intersecting said driven wheel; and
      an engagement arm movably attached to said mower and connected to said drive cog, said engagement arm selectively movable to move said drive cog into and out of engagement with said driven wheel;
   a cart having wheels including driven wheels, an axle drivingly connected to said wheels of said cart, a drive shaft rotated by said mower and connected to said axle of said cart by gears, said drive shaft being vertically supported within said cart, said cart also having a receptacle for receiving clippings cut by said cutter and transported by said cutter to said receptacle, said cart further comprising a handle attached thereto for maneuvering;
   a cart drive detent for controlling driven connection of said wheels of said cart to rotary power provided by said mower, wherein said axle of said cart has a central section, and two wheel sections each connected to one said wheel of said cart,
      said cart drive detent comprising two collars each having means defining a pair of diametrically opposed slots therein and a central radially oriented external flange, each said collar aligned with and telescopically engageable with one of said two wheel sections of said axle,
      each said wheel section of said axle having a pin projecting radially therefrom, each said pin engageable with an associated said collar by penetrating said groove of said associated collar,
      said cart drive detent further comprising a collar positioning yoke engaging said two collars and selectively sliding said two collars into and out of engagement with said two wheel sections of said axle, said cart drive detent further comprising a lever mounted to said cart for actuating said yoke, said lever contacting and engaging said yoke, said lever having an end accessible to a human operator on the exterior of said cart, whereby driving contact of said connecting arm is interrupted by moving said lever, said cart drive detent further comprising a spring mounted to said cart and to said yoke, urging said yoke into the engaged position;

a chute for conducting clippings cut by said cutter to said receptacle; and a connecting arm connecting said mower to said cart and engaging and rotating said vertically supported drive shaft, whereby operation of said mower drives said cutter and propels both said mower and said cart, said drive shaft being centrally located within said cart, whereby said mower orbits concentrically around said cart, said connecting arm having means for adjusting angularity of said connecting arm with respect to said cart, said mower having two fixed wheels and a caster wheel, for stably supporting said mower on the ground and to enable smooth tracking as said mower moves along the ground, and said drive wheels of said cart being fixed to said cart, and said cart further having at least one caster wheel attached thereto, said drive wheels of said cart and said caster wheel of said cart stably supporting said cart on the ground and enabling smooth tracking along the ground.

* * * * *